United States Patent [19]
Cluff

[11] Patent Number: 5,930,036
[45] Date of Patent: Jul. 27, 1999

[54] BINOCULAR SPOTTING SCOPE ASSEMBLY

[76] Inventor: Kenneth L. Cluff, 736 N. Orange Circle, Mesa, Ariz. 85201

[21] Appl. No.: 08/822,037

[22] Filed: Mar. 2, 1997

[51] Int. Cl.[6] .............................. G02B 23/16; F16M 11/12
[52] U.S. Cl. ...................... 359/420; 359/429; 248/183.2; 248/178.1
[58] Field of Search .................................. 359/429, 430, 359/399, 407, 409, 419, 420, 408; 248/163.1, 177.1–185.1

[56] References Cited

U.S. PATENT DOCUMENTS

| | | | |
|---|---|---|---|
| 2,755,053 | 7/1956 | Sloane | 248/179.1 |
| 4,315,560 | 1/1982 | Hale | 359/412 |
| 4,319,825 | 3/1982 | Newton | 396/422 |
| 4,557,451 | 12/1985 | Conway | 248/187.1 |
| 4,669,833 | 6/1987 | Mise | 359/420 |
| 4,768,049 | 8/1988 | Barrett et al. | 354/294 |
| 5,121,220 | 6/1992 | Nakamoto | 359/419 |
| 5,149,900 | 9/1992 | Buck | 42/94 |
| 5,221,991 | 6/1993 | Webster | 359/408 |

*Primary Examiner*—Jon Henry
*Attorney, Agent, or Firm*—John D. Lister

[57] ABSTRACT

A binocular/spotting scope assembly for outdoor and field activities includes binoculars having stereoscopic vision and a spotting scope having a more localized, higher power field of vision than the binoculars. The binoculars and the spotting scope are supported in a substantially horizontal side-by-side relationship on a support which permits the binoculars and the spotting scope to be pivotally adjusted and positioned with respect to each other about both a horizontal axis and a vertical axis so that lines of vision of the binoculars and the spotting scope cross at a point forward of the assembly. Thus, the stereoscopic vision of the binoculars can be used to find an object and the more localized, higher power field of vision of the spotting scope can be used to more carefully examine the object. The support can be mounted on a vertically adjustable, portable base which permits the support, with the binoculars and the spotting scope mounted thereon, to be pivotally adjusted about a vertical axis and a horizontal axis for sighting by an observer through the binoculars and/or the spotting scope.

8 Claims, 3 Drawing Sheets

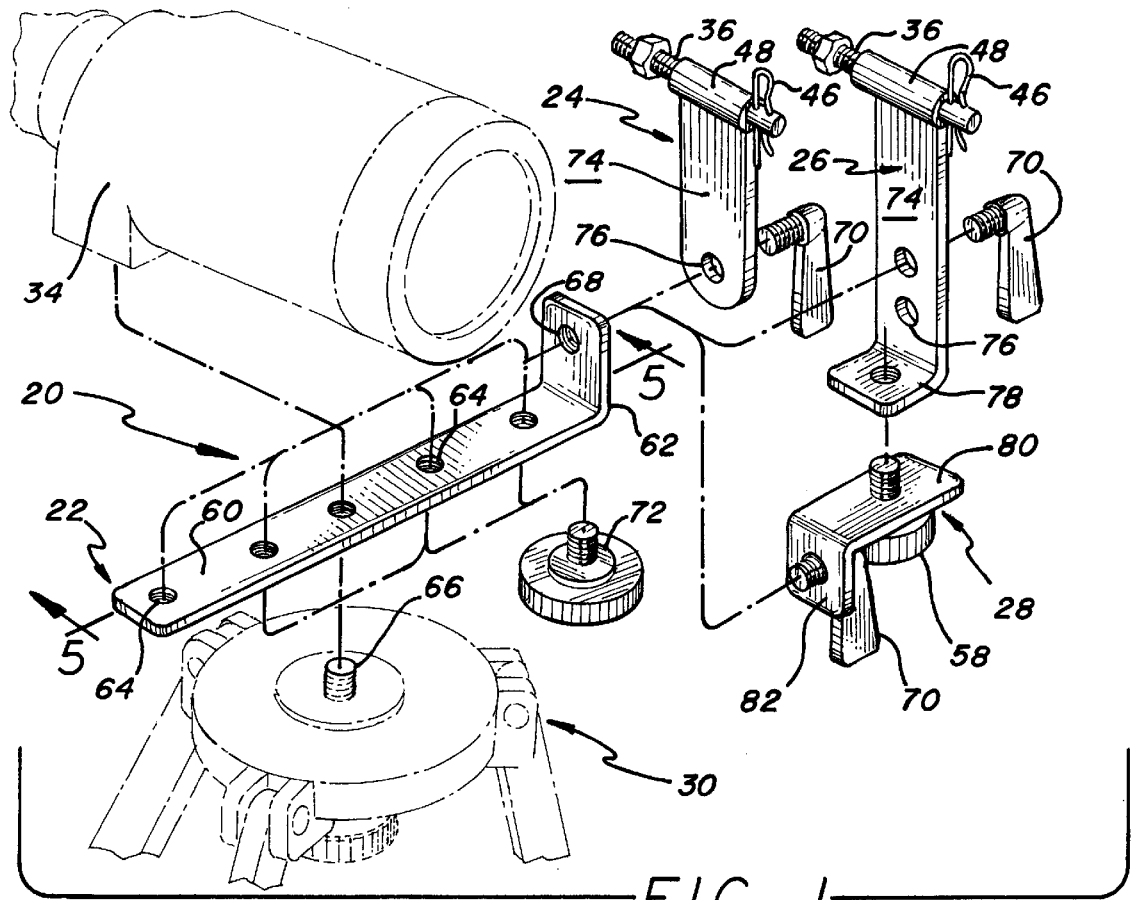
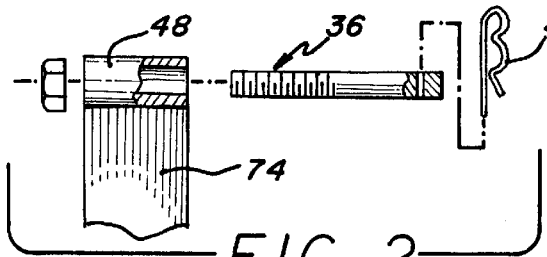
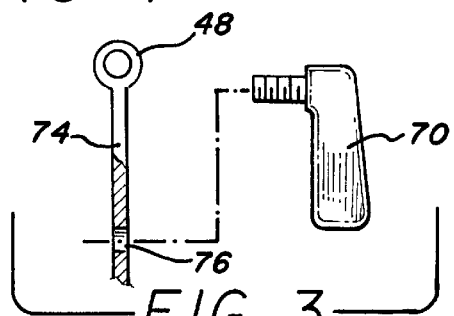
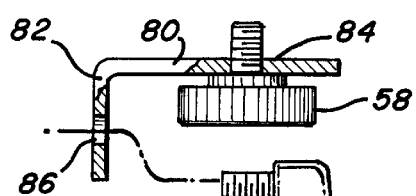
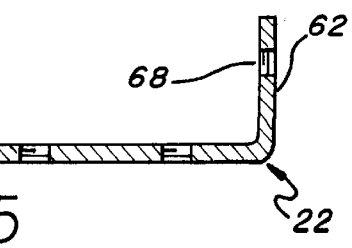

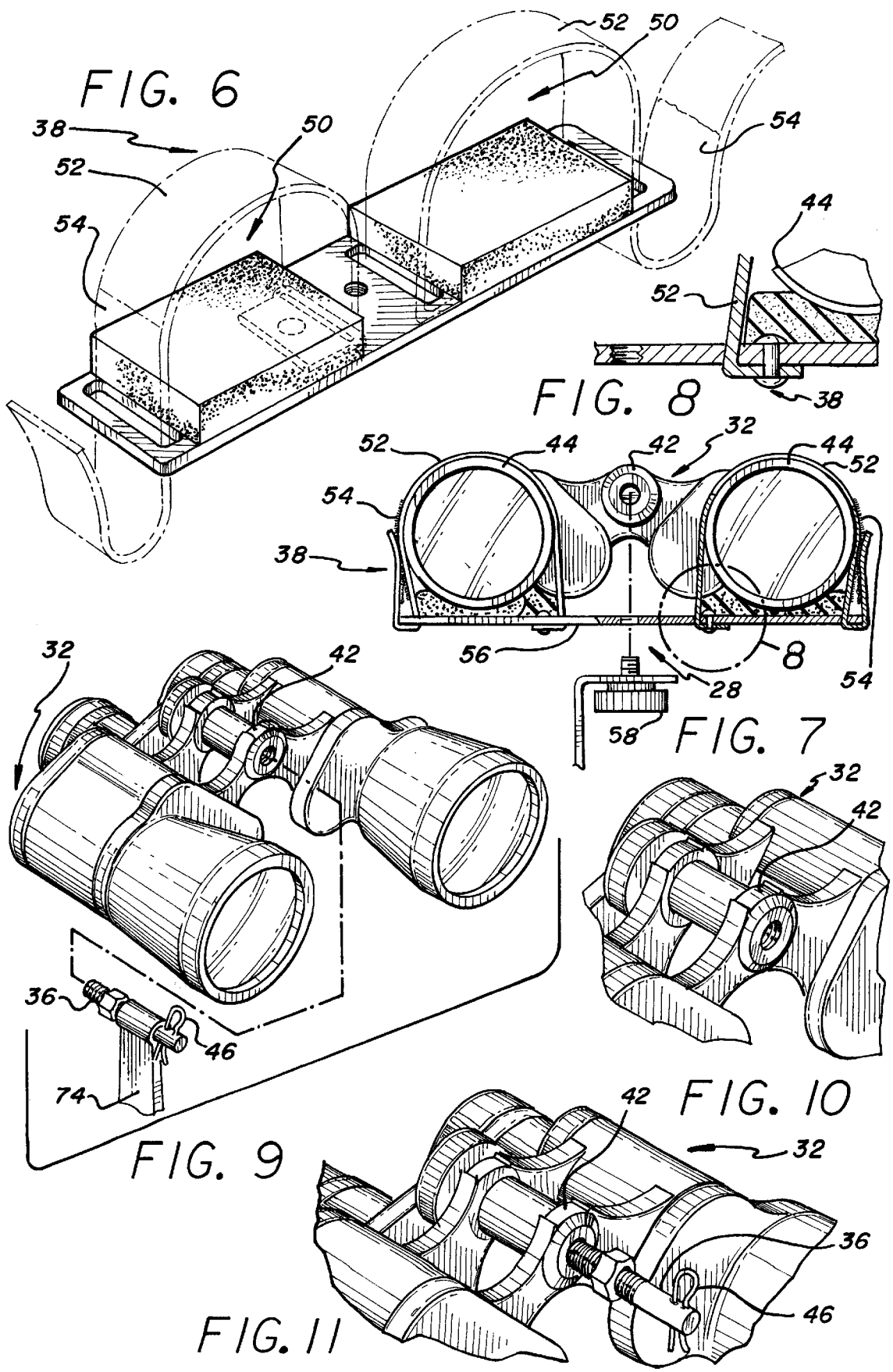

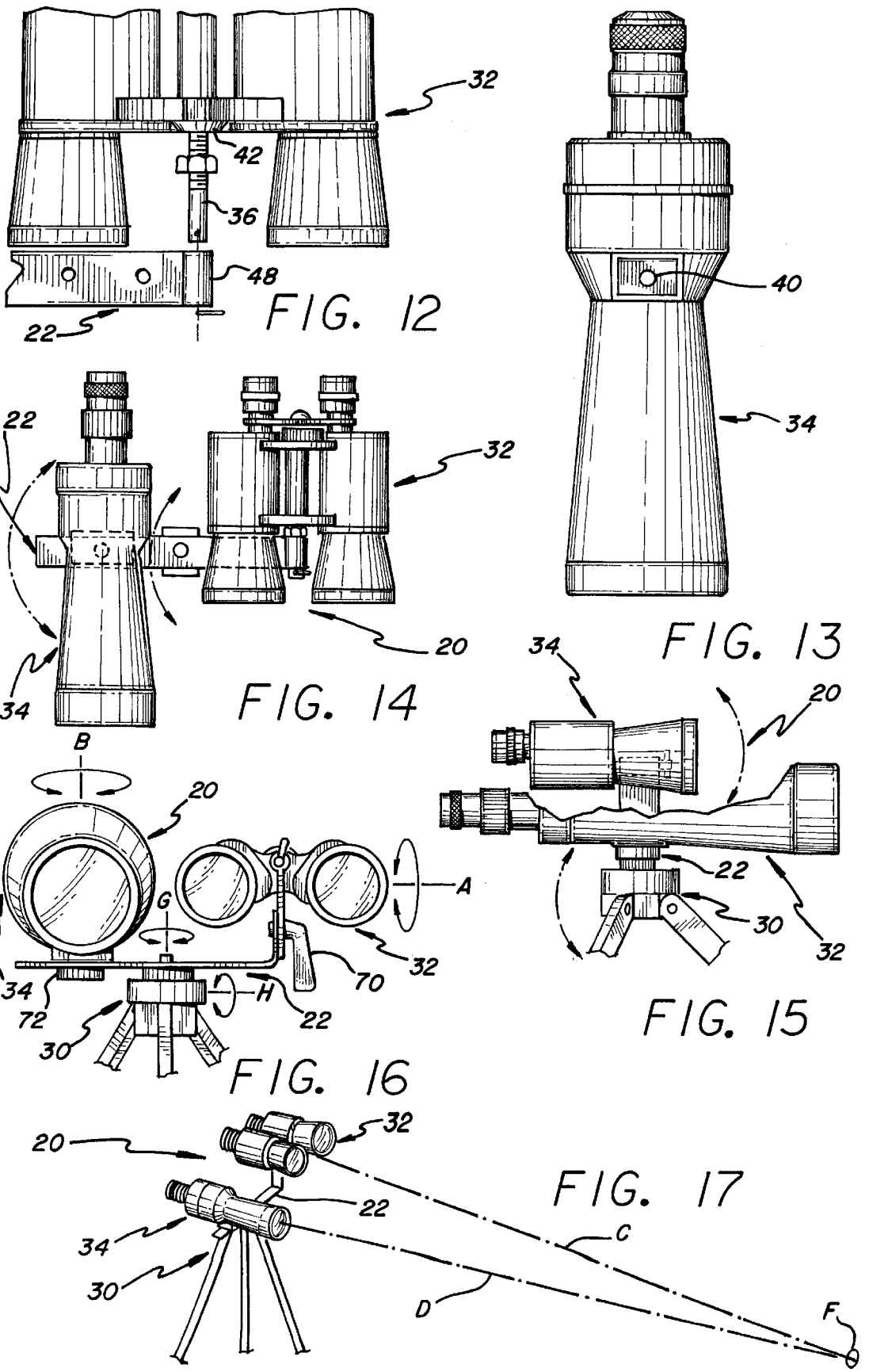

BINOCULAR SPOTTING SCOPE ASSEMBLY

BACKGROUND OF THE INVENTION

The present invention relates to a binocular/spotting scope assembly and, in particular, to a portable binocular/spotting scope assembly especially adapted for use in outdoor and field activities, such as but not limited to, hunting, bird or animal watching, military operations, and outdoor athletic events.

When engaged in certain outdoor activities, such as hunting or bird and animal watching, there is a need to first locate an object, such as an animal or bird, at relatively great distances (e.g. several thousand yards) and then to examine the object more carefully to determine if there is an interest in the object prior to committing oneself to further action. Binoculars, with their relatively wide field of stereoscopic vision, function well when used to locate an object in the distance. However, for a distant object, such as a large object several thousand yards away from the observer or a smaller object a few hundred yards away from the observer, binoculars do not normally provide the degree of magnification or power required to view the object in detail. Spotting scopes with their relatively high degree of magnification or power provide an observer with a good detailed view of an object when the spotting scope is accurately sighted on the object. However, due to their limited or narrow field of vision, it is often very difficult to accurately sight spotting scopes on an object, especially at a distance. In fact, when using a spotting scope alone the narrow or limited field of vision of the spotting scope often make it extremely difficult, if not impossible, to efficiently and effectively locate a distant object, such as an animal or a bird especially when it is moving. Thus, there has been a need to provide a highly portable means, which can be easily and effectively used in the field, for combining the benefits of the wide stereoscopic vision of binoculars with the higher powered vision of a spotting scope to enable an observer to effectively and efficiently locate and then examine in detail an object at a great distance. The term "object" as used herein is intended to include a single object or multiple objects, either animate or inanimate.

SUMMARY OF THE INVENTION

The present invention solves the problems of the prior art by providing an inexpensive, easy to use, highly portable, highly accurate, binocular/spotting scope assembly for outdoor and field activities. The binocular/spotting scope assembly includes binoculars having a wide, stereoscopic vision and a spotting scope having a more localized, higher power field of vision than the binoculars. The binoculars and the spotting scope are supported in a substantially horizontal side-by-side relationship on a support which permits the binoculars and the spotting scope to be pivotally adjusted and positioned with respect to each other about both a horizontal axis and a vertical axis so that lines of vision of the binoculars and the spotting scope cross at a point forward of the assembly and the stereoscopic vision of the binoculars can be used to find an object and the more localized, higher power field of vision of the spotting scope can be used to more carefully examine the object.

In use, the observer can locate an object in the distance, either moving or stationary, with the binoculars and center the object in the line or field of vision of the binoculars. By centering the object in the line or field of vision of the binoculars, the object is also centered in the line or field of vision of the spotting scope. Since the binoculars and the spotting scope are positioned in a side-by side relationship, once the observer has centered the object in the line or field of vision of the binoculars, the observer can quickly and easily switch his/her viewing of the object to the spotting scope to view the object in greater detail.

The support carrying the binoculars and the spotting scope is preferably mounted on a vertically adjustable, portable base, such as a tripod, which permits the support, with the binoculars and the spotting scope mounted thereon, to be pivotally adjusted about a vertical axis and a horizontal axis for sighting by an observer through the binoculars and/or the spotting scope. Both the binoculars and the spotting scope are preferably mounted on the support by mounting means which permit the binoculars and/or the spotting scope to be quickly and easily mounted on or detached from the support by the observer for use independent of the binocular/spotting scope assembly.

BRIEF DESCRIPTION OF THE DRAWINGS

FIG. 1 is an exploded perspective view, with a spotting scope and support base in phantom line, of the binocular/spotting scope assembly showing alternative ways of and components for mounting the binoculars and spotting scope on the support bracket of the binocular/spotting scope assembly.

FIG. 2 is an exploded view showing a set of components for mounting binoculars on a mounting member of the support bracket of the binocular/spotting scope assembly.

FIG. 3 is an exploded view showing a preferred fastener for securing the mounting member of FIG. 2 to the support bracket of the binocular/spotting scope assembly.

FIG. 4 is an exploded view of another mounting member for securing binoculars or a spotting scope to the support bracket of the binocular/spotting scope assembly.

FIG. 5 is an elevational view of a preferred form of the support bracket of the binocular/spotting scope assembly.

FIG. 6 is a perspective view of a binocular mount for mounting binoculars on the mounting member of FIG. 4.

FIG. 7 is an exploded front elevation showing binoculars in the binocular mount of FIG. 6 being secured to the mounting member of FIG. 4.

FIG. 8 is an enlarged view of the circled portion of FIG. 7.

FIG. 9 is an exploded perspective view of a portion of the binocular/spotting scope assembly showing the relationship between the quick-release rod or pin member, the mounting member and the binocular frame.

FIG. 10 is a view of a portion of a binocular frame showing the threaded opening for receiving the quick-release rod member.

FIG. 11 is a view of a portion of a binocular frame with the quick-release rod member mounted therein.

FIG. 12 is a partial top view of binoculars with the quick-release rod member mounted therein and the mounting member of the support bracket.

FIG. 13 is a bottom view of a spotting scope.

FIG. 14 is a top view of the binocular/spotting scope assembly with binoculars and a spotting scope mounted thereon.

FIG. 15 is a side view of the binocular/spotting scope assembly with the binoculars and a spotting scope mounted thereon.

FIG. 16 is a front view of the binocular/spotting scope assembly with the binoculars and a spotting scope mounted thereon.

FIG. 17 is a schematic perspective view showing the binoculars and the spotting scope of a binocular/spotting scope assembly adjusted so that their lines of vision intersect at a desired point.

DESCRIPTION OF THE PREFERRED EMBODIMENTS

FIG. 1 shows several preferred embodiments of the binocular/spotting scope assembly 20 of the present invention which includes a main support bracket 22; alternative mounting members 24, 26 and 28; and preferably, includes a support base 30 (shown in to phantom line). FIGS. 2–13 further illustrate the mounting of binoculars 32 and/or a spotting scope 34 on the binocular/spotting scope assembly 20 by means of the mounting members 24, 26 and 28. As discussed above, the binocular/spotting scope assembly 20 is used with binoculars 32 having a wide, stereoscopic vision and a spotting scope 34 having a more localized, higher power field of vision than the binoculars. To derive the greatest benefit from the present invention, the binoculars 32 and the spotting scope 34 should be supported, as shown in FIGS. 14–17, in a substantially horizontal side-by-side relationship on a support which permits the binoculars and the spotting scope to be pivotally adjusted and positioned with respect to each other about both a horizontal axis (such as axis "A" in FIG. 16) and a vertical axis (such as axis "B" in FIG. 16). By adjusting the binoculars 32 and the spotting scope 34 about the axes A and B, the lines of vision or sight (lines "C" and "D" in FIG. 17) of the binoculars 32 and the spotting scope 34 can be set to cross at a point ("F") typically well forward of the binocular/spotting scope assembly 20 (e.g. 100 to 1000 yards). Once the binoculars 32 and spotting scope 34 are correctly positioned, the stereoscopic vision of the binoculars can be used to find an object and the more localized, higher power field of vision of the spotting scope can be used to more carefully examine the object. Preferably, the binocular/spotting scope assembly 20 includes the support base 30 (typically a conventional, commercially available tripod) which permits the main support bracket 22 to be raised, lowered and pivoted about both a vertical axis ("G") and a horizontal axis ("H"). Thus, once the binoculars 32 and the spotting scope 34 have been mounted and adjusted on the binocular/spotting scope assembly 20 to have the lines of vision or sight C and D cross at a desired point F, the binoculars 32 and the spotting scope 34 can be moved in unison to locate and study an object.

The binoculars 32 are preferably provided with a quick-release pin or rod member 36, as shown in FIGS. 9–12, which permits the binoculars 32 to be quickly and easily secured to and detached from the mounting members 24 and 26 or a quick release mount 38, as shown in FIGS. 6–8, which permits the binoculars to be quickly and easily secured to and detached from the mounting member 28. In addition to the quick-release pin 36 and mount 38, the binoculars 32 may also be provided with other mounting means (not shown) which permit the binoculars 32 to be secured to and detached from the binocular/spotting scope assembly 20. The spotting scope 34 is preferably provided with a threaded opening 40 as shown in FIG. 13 for quickly and easily securing the spotting scope 34 to and detaching the spotting scope 34 from the main support bracket 22, but may also be provided with other means (not shown) for permitting the spotting scope 34 to be secured to and detached from the main support bracket 22.

The quick-release pin or rod member 36, is threaded into an opening of or otherwise secured to the central hinge portion 42 of the binoculars 32 and extends forward from the hinge portion 42 of the binoculars in a direction generally parallel with the monocular barrels 44 of the binoculars 32. The free end of the quick-release pin 36 is provided with a cotter pin 46 or other fastening means for securing the quick-release pin 36 within a sleeve 48 of either mounting member 24 or 26. With this arrangement, the binoculars 32 can be quickly and easily secured to and detached from the sleeve 48 of the mounting member 24 or 26.

The quick-release mount 38 of FIGS. 6–8 is of the general type disclosed in U.S. Pat. No. 5,221,991, issued Jun. 22, 1993, and entitled "Device To Secure Binoculars To A Tripod", the disclosure of which is hereby incorporated herein by reference. To mount the binoculars 32 on the quick-release mount 38, the monocular barrels 44 of the binoculars are inserted through the loops 50 of straps 52 and the straps 52 are tightened about the monocular barrels 44 of the binoculars 32 and secured in place by bringing together the VELCRO fastening surfaces 54 of the straps 52. To remove the binoculars 32 from the quick-release mount 38, the straps 52 are merely loosened by separating the VELCRO fastening surfaces 54. The base 56 of the quick-release mount is detachably secured to the mounting member 28 by means of threaded fastener 58 which is threaded into the base 56.

As shown in FIGS. 1 and 5, the main support bracket 22 includes an elongated horizontal arm 60 with a vertical arm 62 located at and extending upward from one end of the horizontal arm 60. The horizontal arm 60 has one or more vertically extending threaded openings 64 therein which can receive and retain a threaded fastener 66 of the base support 30 and the vertical arm 62 has one or more horizontally extending threaded openings 68 therein which can receive and retain a threaded fastener 70 to secure one of the mounting members 24, 26 or 28 to the main support bracket 22. One of the openings 64 is used to secure the main support bracket 22 onto the base support 30 by threading the fastener 66 of the base support 30 into the opening. Another of the openings 64 is normally used to secure the spotting scope 34 to the main support bracket 22 by means of the threaded fastener 72 which is preferably of a size or diameter that it can be freely passed through the opening 64 and threaded into the threaded opening 40 in the spotting scope 34. By loosening the fastener 72, the spotting scope 34 can be pivoted about the vertical axis B to sight the line of vision D of the spotting scope on a point F. Once the line of vision D of the spotting scope 34 is sighted on point F, the fastener 72 can be tightened into the opening 40 of the spotting scope 34 to hold the spotting scope in position. By having a series of openings 64 in the horizontal arm 60 of the main support bracket 22, the observer can select which openings to use for best mounting the support bracket 22 onto the base support 30 and the spotting scope 34 onto the main support bracket 22.

Mounting member 24 is designed to secure binoculars 32, which have been provided with the quick-release pin 36 of FIGS. 9–12, to the main support bracket 22 so that the binoculars 32 can be quickly and easily removed from the binocular/spotting scope assembly 20 for independent use. Mounting member 28 is designed to secure binoculars 32, which have been provided with the quick-release mount 38 of FIGS. 6–8, to the main support bracket 22 so that the binoculars 32 can be quickly and easily removed from the binocular spotting scope assembly 20 for independent use. Mounting member 26 can be used to secure binoculars 32, which have been provided with a quick-release pin 36, directly to the main support bracket 22 or to the mounting member 28 so that the binoculars 32 can be quickly and easily removed from the binocular spotting scope assembly 20 for independent use.

As best shown in FIGS. 1–3, the mounting members 24 and 26 each include an elongated arm 74 with the sleeve or tubular portion located at the upper end and extending at a generally right angle to the longitudinal centerline of the arm 74. The elongated arms 74 are also provided with one or more openings 76 through which the threaded fastener 70 is freely passed and threaded into the threaded opening 68 of the main support bracket 22 to secure the mounting member 24 or 26 to the vertical arm 62 of the main support bracket 22.

By loosening the fastener 70 the arm 74 of the mounting member 24 can be pivoted about the horizontal axis A to sight the line of vision C of the binoculars 32 on the point F. Once the line of vision C of the binoculars 32 is sighted on point F, the fastener 70 can be tightened into the opening 68 of the arm 62 to hold the mounting member 24 and the binoculars 32 secured to the mounting member 24 in position. If the mounting member 26 is secured directly to the arm 62 of the main support bracket 22 with the fastener 70, depending on the opening 76 in the mounting member 26 through which the fastener 70 is passed, the pivotal movement of the mounting member 26 about the horizontal axis A may be limited or prevented due to the extension 78 at the base of the mounting member 26 which is normally used to secure the mounting member 26 a to a mounting member 28. Thus, while the mounting member 26 can be secured directly to the arm 62 of the main support bracket 22 by the fastener 70, generally the mounting member 26 is secured to the arm 62 of the main support bracket 22 by means of the support a member 28 which permits the mounting member 26 to be pivoted about the horizontal axis A.

Mounting member 28 includes two arms 80 and 82 which extend a generally right angles to each other. Arm 80 has an opening 84 therein through which the threaded fastener 58 passes to be threaded into the base of the quick-release mount 38 or the extension 78 of mounting member 26. Arm 82 has an opening 86 therein through which the threaded fastener 70 passes to be threaded into the threaded opening 68 of arm 62 of the main support bracket 22. By loosening the fastener 70 the mounting member 28 can be pivoted about the horizontal axis A to sight the line of vision C of the binoculars 32 on the point F. Once the line of vision C of the binoculars 32 is sighted on point F, the fastener 70 can be tightened into the opening 68 of the arm 62 to hold the mounting member 28 and the binoculars 32 secured to the mounting member 24 in position.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A binocular/spotting scope assembly for outdoor and field activities comprising:

binoculars having stereoscopic vision and a spotting scope having a more localized, higher power field of vision than the binoculars;

the binoculars and the spotting scope being supported on a support means in a substantially horizontal side-by-side relationship; the support means including mounting means for pivotally adjusting and positioning the binoculars and the spotting scope with respect to each other about both a horizontal axis and a vertical axis so that lines of vision of the binoculars and the spotting scope cross at a point forward of the assembly and for maintaining the binoculars and the spotting scope in place with respect to each other as positioned so that the stereoscopic vision of the binoculars can be used to find an object and the more localized, higher power vision of the spotting scope can be used to more carefully examine the object.

2. The binocular/spotting scope assembly of claim 1, wherein; the mounting means includes means for easily attaching the binoculars and the spotting scope to and detaching the binoculars and the spotting scope from the support means.

3. The binocular/spotting scope assembly of claim 1, wherein: the mounting means includes a quick-release means for quickly attaching the binoculars to and detaching the binoculars from the support means.

4. The binocular/spotting scope assembly of claim 3, wherein: the quick-release means includes a rod member means mounted on the binoculars; a sleeve means on the mounting means for receiving the rod member means; and a means for holding the rod member means in place within the sleeve means.

5. The binocular/spotting scope assembly of claim 1, wherein: the mounting means includes means for pivoting the binoculars about a horizontal axis and the spotting scope about a vertical axis.

6. The binocular/spotting scope assembly of claim 1, including: a portable base upon which the support means is mounted by a second mounting means for pivoting the support means with the binoculars and the spotting scope mounted thereon about a vertical axis and a horizontal axis for sighting through the binoculars and/or the spotting scope.

7. The binocular/spotting scope assembly of claim 6, wherein: the portable base is a tripod assembly upon which the support means is detachably mounted.

8. The binocular/spotting scope assembly of claim 6, including: means for vertically adjusting the height of the portable base so that the support means with the binoculars and spotting scope mounted thereon can be adjusted to a desired height for use by an observer.

* * * * *